(12) United States Patent
Zhao et al.

(10) Patent No.: US 12,315,178 B2
(45) Date of Patent: May 27, 2025

(54) EYE MOVEMENT ANALYSIS METHOD AND SYSTEM

(71) Applicant: KINGFAR INTERNATIONAL INC., Beijing (CN)

(72) Inventors: Qichao Zhao, Beijing (CN); Ran Yang, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 206 days.

(21) Appl. No.: 18/088,960

(22) Filed: Dec. 27, 2022

(65) Prior Publication Data
US 2024/0062400 A1 Feb. 22, 2024

(30) Foreign Application Priority Data
Aug. 19, 2022 (CN) .......................... 202211001336.0

(51) Int. Cl.
G06T 7/55 (2017.01)

(52) U.S. Cl.
CPC ...... *G06T 7/55* (2017.01); *G06T 2207/10004* (2013.01)

(58) Field of Classification Search
CPC ... G06T 7/55; G06T 2207/10004; G06N 3/08; G06N 3/0455; G06N 3/0464;
(Continued)

(56) References Cited

U.S. PATENT DOCUMENTS

| 11,225,266 B2* | 1/2022 | Domeyer ............... B60K 35/10 |
| 2020/0064912 A1 | 2/2020 | Melatti et al. |

(Continued)

FOREIGN PATENT DOCUMENTS

| CN | 108665496 A | 10/2018 |
| CN | 110276334 A | 9/2019 |

(Continued)

OTHER PUBLICATIONS

Karen Panetta, et al.; "ISeeColor: Method for Advanced Visual Analytics of Eye Tracking Data"; IEEE Access; Mar. 16, 2020; 10 Pgs.
(Continued)

*Primary Examiner* — Kent W Chang
*Assistant Examiner* — Karl Duc Truong
(74) *Attorney, Agent, or Firm* — Cooper Legal Group, LLC (57) ABSTRACT

An eye movement analysis method comprises: acquiring a first scene video seen by a target user in a preset environment, and simultaneously acquiring eye movement gaze data of the target user in the environment; performing semantic segmentation on the first scene video based on a deep learning algorithm to obtain a second scene video, wherein the second scene video is divided to have eye movement area of interest; superposing the eye movement gaze data with the second scene video to obtain a gaze pixel point corresponding to the eye movement gaze data in the second scene video; and determining the gaze pixel point corresponding to each frame image in the second scene video and outputting eye movement data index of the target user gazing at the eye movement area of interest in combination with time sequence.

4 Claims, 3 Drawing Sheets

(58) Field of Classification Search
CPC ...... G06V 10/25; G06V 10/60; G06V 10/806; G06V 10/811; G06V 10/82; G06V 20/52; G06V 20/70; G06V 40/193; G06V 40/19
See application file for complete search history.

(56) References Cited

U.S. PATENT DOCUMENTS

| | | | |
|---|---|---|---|
| 2021/0053586 A1* | 2/2021 | Domeyer | B60W 60/00 |
| 2021/0342644 A1* | 11/2021 | Skuin | G06N 20/00 |
| 2021/0350184 A1* | 11/2021 | Mallik | G06N 3/08 |

FOREIGN PATENT DOCUMENTS

| | | |
|---|---|---|
| CN | 112949409 A | 6/2021 |
| CN | 113391699 A | 9/2021 |
| CN | 113661495 A | 11/2021 |
| CN | 114120432 A | 3/2022 |
| RU | 2017143204 A3 | 6/2019 |

OTHER PUBLICATIONS

Bo Liu, et al.; "An elaborate algorithm for automatic processing of eye movement data and identifying fixations in eye-tracking experiments" Advances in Mechanical Engineering; Dec. 31, 2018; 15 Pgs.

European Patent Office; European Search Report of corresponding Application No. EP 22216993; Aug. 22, 2023.

Dong, et al.; "Comparing pedestrians' gaze behavior in desktop and in real environments"; Cartography and Geographic Information Science 20200902, Taylor & Francis Inc. USA, vol. 47, No. 5; Sep. 2, 2020; pp. 432-451.

* cited by examiner

EYE MOVEMENT ANALYSIS METHOD AND SYSTEM

CROSS-REFERENCE TO RELATED APPLICATION

This application claims the priority and benefit of Chinese patent application No. 202211001336.0, filed on Aug. 19, 2022. The entirety of Chinese patent application No. 202211001336.0 is hereby incorporated by reference herein and made a part of this specification.

TECHNICAL FIELD

The present application relates to the technical field of eye movement data analysis, and in particular to an eye movement analysis method and system.

BACKGROUND ART

As early as the 19th century, some researchers thought that the eye movement process to some extent implied the law of the human cognitive process. The eye movement tracking technology and wearable eye movement tracking apparatus are thus developed. The eye movement tracking technology uses electronic and optical detection methods to acquire eye movement gaze data of the eye movement behavior of a target user, and then studies and analyzes human behavior and eye movement behavior.

Currently, data analysis based on Area of Interest (AOI) is a commonly used research and analysis method for eye movement behavior. According to the purpose of experiments, researchers line out one region on the test material which contains a research object, and this region is called eye movement AOI. By determining the gaze pixel point of the eye movement gaze data of the target user on the test material, the data indexes of the target user on the AOI are obtained, such as the first gaze time, visit times, total visit duration, gaze times, total gaze duration, average gaze duration, etc.

With regard to the above-mentioned related art, the inventors have found that when studying and analyzing the eye movement behavior of a target user in a preset environment, since the shape and position of a research object in a scene video tend to change, a researcher needs to adjust the shape and position of an area of interest on a frame-by-frame basis to ensure that the area of interest always covers the research object in the scene video, and then maps the eye movement data of the target user into each frame image of the scene video; therefore, when the shape and position of the research object in the scene video change dynamically, it takes a lot of time to study the eye movement behavior of the target user.

SUMMARY

The present application provides an eye movement analysis method and system in order to reduce the time required to study the eye movement behavior of a target user when the shape and position of the research object in the scene video change dynamically.

In the first aspect, the present application provides an eye movement analysis method, using the following technical solution:

an eye movement analysis method, comprising acquiring a first scene video seen by a target user in a preset environment, and simultaneously acquiring eye movement gaze data of the target user in the environment;

performing semantic segmentation on the first scene video based on a deep learning algorithm to obtain a second scene video, wherein the second scene video is divided to have eye movement area of interest;

superposing the eye movement gaze data with the second scene video to obtain a gaze pixel point corresponding to the eye movement gaze data in the second scene video; and determining the gaze pixel point corresponding to each frame image in the second scene video and outputting, in combination with time sequence, the eye movement data index of the target user gazing at the eye movement area of interest.

By using the above-mentioned technical solution, the following can be realized: acquiring a first scene video seen by a target user in a preset environment, and acquiring eye movement gaze data of the target user in the environment; based on the deep learning algorithm, performing semantic segmentation on the first scene video to realize the automatic division and identification of the eye movement area of interest of the first scene video so as to obtain the second scene video, and superposing the eye movement gaze data with the second scene video to obtain the corresponding gaze pixel point of the eye movement gaze data in the second scene video. Therefore, the eye movement data index, such as gaze times, gaze times, etc., of the target user gazing at the eye movement area of interest in the environment can be obtained and output. Since the present application uses the deep learning algorithm, performs semantic segmentation on the first scene video, and automatically divides the eye movement area of interest, to a certain extent, researchers can avoid spending a lot of time adjusting the shape and size of the eye movement area of interest frame by frame, and further, the time required to study the eye movement behavior of the target user can be reduced when the shape and position of the research object in the scene video change dynamically.

Alternatively, the deep learning algorithm uses DeepLab, EncNet, SegNet, or PSPNet.

Alternatively, performing semantic segmentation on the first scene video comprises:

assigning a semantic tag to each pixel in the first scene video;

and automatically dividing the eye movement area of interest based on the category of the semantic tag.

By using the above-mentioned technical solution, semantic segmentation can assign a semantic tag to each pixel in the first scene video, indicating the category of each pixel; pixels of the same category having the same semantic tag are automatically drawn into the eye movement area of interest.

Alternatively, superposing the eye movement gaze data with the second scene video to obtain a gaze pixel point corresponding to the eye movement gaze data in the second scene video includes:

acquiring a first coordinate point corresponding to the eye movement gaze data in a first coordinate system, wherein the first coordinate system is a three-dimensional coordinate system, and the first coordinate system takes a scene camera shooting the first scene video as an origin of coordinate, takes a vertical direction as a coordinate Z axis, takes a horizontal shooting direction to which the scene camera directly faces as a coordinate X axis, and takes a direction perpendicular to the horizontal shooting direction of the scene camera as a coordinate Y axis;

converting the first coordinate point into a second coordinate system of the second scene video to obtain a second coordinate point, wherein the second coordinate system is one two-dimensional coordinate system, and the second coordinate system takes a central pixel point of the second scene video as the origin of coordinate, takes a transverse arrangement direction of pixels as the coordinate X axis, and takes a longitudinal arrangement direction of pixels as the coordinate Y axis;

and corresponding the second coordinate point to a pixel point of the second scene video to obtain the gaze pixel point corresponding to eye movement gaze data in the second scene video.

By using the above-mentioned technical solution, the first coordinate system is one three-dimensional coordinate system, and the first coordinate system can take the scene camera as the origin of the coordinate, and the position of the gazed object can be represented by the three-dimensional coordinate point or the vector of the line of sight of the target user; the second coordinate system is one two-dimensional coordinate system, and the second coordinate system can take the central point of the second scene video as the origin of coordinate, and after superposing the eye movement gaze data with the second scene video, the gazed object of the target user can be corresponding to one gaze pixel in the second scene video.

Alternatively, determining the gaze pixel point corresponding to each frame image in the second scene video and outputting, in combination with a time sequence, eye movement data index of the target user gazing at the eye movement area of interest include:

determining an order and a number, in which semantic tags of gaze pixel points in each frame image of the second scene video appear in the time sequence;

calculating and outputting the eye movement data index based on the order and the number in which the semantic tags appear in the time sequence.

By using the above-mentioned technical solution, since each pixel in the second scene video has a semantic tag; after a gazed object of a target user is corresponding to one gaze pixel in the second scene video, the semantic tag category of the gaze pixel can learn an eye movement area of interest gazed by the target user; by determining the gaze pixel on each frame image of the second scene video, an eye movement data index of the target user gazing at the eye movement area of interest can be output.

Alternatively, determining indexes of the eye movement area of interest comprise: the first gaze time, the number of visits, the total visit duration, the gaze times, the total gaze duration, and the average gaze duration.

In the second aspect, the present application provides an eye movement analysis system, using the following technical solutions:

an eye movement analysis system, comprising a first acquisition module, a second acquisition module, a semantic segmentation module, a superposition module, and an output module; wherein the first acquisition module is configured for acquiring a first scene video seen by a target user in a preset environment;

the second acquisition module is configured for simultaneously acquiring eye movement gaze data of the target user in the environment when the first acquisition module acquires the first scene video;

the semantic segmentation module is configured for receiving the first scene video, and performing semantic segmentation on the first scene video by using a deep learning algorithm to obtain a second scene video, wherein the second scene video is divided to have an eye movement area of interest;

the superposition module is configured for receiving the second scene video and the eye movement gaze data, and superposing the eye movement gaze data with the second scene video to obtain a gaze pixel point corresponding to the eye movement gaze data in the second scene video;

the output module is configured for determining the gaze pixel point of each frame image in the second scene video, and outputting, in combination with a time sequence, an eye movement data index of the target user gazing at the eye movement area of interest.

By using the above-mentioned technical solutions, the first acquisition module acquires a first scene video seen by a target user in a preset environment, and at the same time, the second acquisition module acquires eye movement gaze data of the target user in the environment; the semantic segmentation module, based on the deep learning algorithm, performs semantic segmentation on the first scene video to realize the automatic division and identification of the eye movement area of interest of the first scene video so as to obtain the second scene video, and then the superposition module superposes the eye movement gaze data with the second scene video to obtain the corresponding gaze pixel point of the eye movement gaze data in the second scene video; therefore, the output module can output the eye movement data index of the target user gazing at the eye movement area of interest in the environment; since the present application uses the deep learning algorithm, performs semantic segmentation on the first scene video, and automatically divides the eye movement area of interest, to a certain extent, researchers can avoid spending a lot of time adjusting the shape and size of the eye movement area of interest frame by frame, and further, the time required to study the eye movement behavior of the target user can be reduced when the shape and position of the research object in the scene video change dynamically.

Alternatively, the superposition module comprises a acquiring unit, a conversion unit, and a corresponding unit; wherein, the acquiring unit is configured for acquiring a first coordinate point corresponding to the eye movement gaze data in a first coordinate system;

the conversion unit is configured for converting the first coordinate point into a second coordinate system of the second scene video to obtain a second coordinate point;

the corresponding unit is configured for corresponding the second coordinate point to a pixel point of the second scene video, and obtaining a gaze pixel point corresponding to the eye movement gaze data in the second scene video.

By using the above-mentioned technical solution, the eye movement gaze data of the target user is converted into the coordinate system of the second scene video, and the eye movement gaze data corresponds to the gaze pixel point of the second scene video.

In the third aspect, the present application provides a computer apparatus, using the following technical solution:

a computer apparatus, including memory, a processor, and a computer program stored on the memory and executable on the processor. The processor, when executing a program, realizes the method as in the first aspect.

In the fourth aspect, the present application provides a computer-readable storage medium, using the technical solution as follows:

the computer-readable storage medium stores a computer program capable of being loaded by a processor and executing the method of the first aspect.

In summary, the present application at least includes the following beneficial effects.

In the present application, the following can be realized: acquiring a first scene video seen by a target user in a preset environment, and acquiring eye movement gaze data of the target user in the environment; based on the deep learning algorithm, performing semantic segmentation on the first scene video to realize the automatic division and identification of the eye movement area of interest of the first scene video so as to obtain the second scene video, and superposing the eye movement gaze data with the second scene video to obtain the corresponding gaze pixel point of the eye movement gaze data in the second scene video. Therefore, the eye movement data index, such as gaze times, gaze times, etc. of the target user gazing at the eye movement area of interest in the environment can be obtained and output. The present application reduces the amount of data processing by researchers, thus reducing the time for research and analysis of eye movement behaviors of a target user in the preset environment.

DETAILED DESCRIPTION

In order to make the objects, technical schemes, and advantages of the present invention more apparent, a more particular description of the invention will be rendered below with reference to the embodiments and appended drawings 1-6. It is to be understood that the specific embodiments described herein are merely illustrative of the present invention and are not intended to be limiting thereof. Based on the embodiments of the present application, all other embodiments obtained by one of ordinary skills in the art without involving any inventive efforts are within the scope of the present application.

Figure 1:
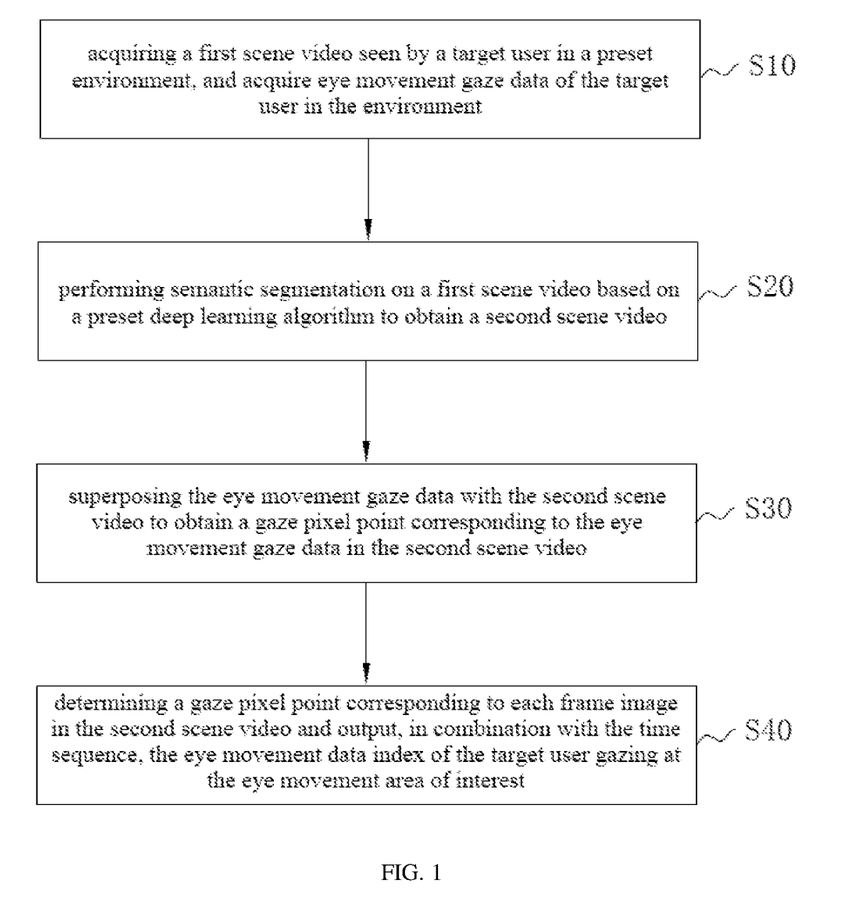
FIG. 1 is a schematic flow diagram of an eye movement analysis method according to one of the embodiments of the present application.

As shown in FIG. 1, an embodiment of the present application discloses an eye movement analysis method, comprising the steps of S10-S40:

S10, acquiring a first scene video seen by a target user in a preset environment, and acquiring eye movement gaze data of the target user in the environment;

wherein, specifically, the preset environment contains a research object, a scene camera records a picture seen by a target user in the preset environment so as to acquire the first scene video, the first scene video comprises multiple frames of a first scene image, and in the present implementation mode, the shape and position of the research object in the first scene video dynamically change; at the same time, the eyes of the target user are illuminated with a light source, so that the eyes of the target user generate an obvious reflection, and an acquisition camera is used to collect multiple frames of eye images of the target user; then these eye images are used to identify the reflection of the light source on the cornea and the pupil, and eye movement gaze data is obtained by calculating the reflection angle of the light source between the cornea and the pupil; furthermore, there are multiple sets of eye movement gaze data, and the eye movement gaze data corresponds to the first scene image on a one-to-one basis in a time sequence.

Figure 2:
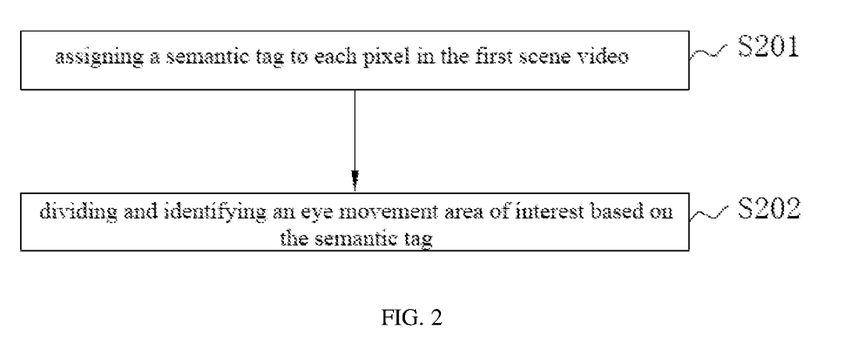
FIG. 2 is a specific schematic flow diagram of step S120 in the present application.

S20, performing semantic segmentation on a first scene video based on a deep learning algorithm to obtain a second scene video;

wherein, specifically, the second scene video is a video processed through semantic segmentation, and the second scene video is divided to have an eye movement area of interest; as shown in FIG. 2, semantic segmentation is performed on the first scene video, including sub-steps S201-S202:

S201, assigning a semantic tag to each pixel in the first scene video;

wherein, specifically, the semantic segmentation architecture uses a convolution neural network (CNN), and by training the convolution neural network, the semantic segmentation can generate one semantic tag for each pixel of the first scene video, wherein the training algorithm is the prior art, and thus will not be elaborated herein.

S202, dividing an eye movement area of interest based on a semantic tag.

Specifically, pixels having the same semantic tag are divided into the same eye movement area of interest.

In the present implementation mode, the deep learning algorithm uses DeepLab, EncNet, SegNet, or PSPNet; likewise, the second scene video comprises multiple frames of second scene images, and the second scene images correspond to the first scene images on a one-to-one basis in a time sequence.

Figure 3:
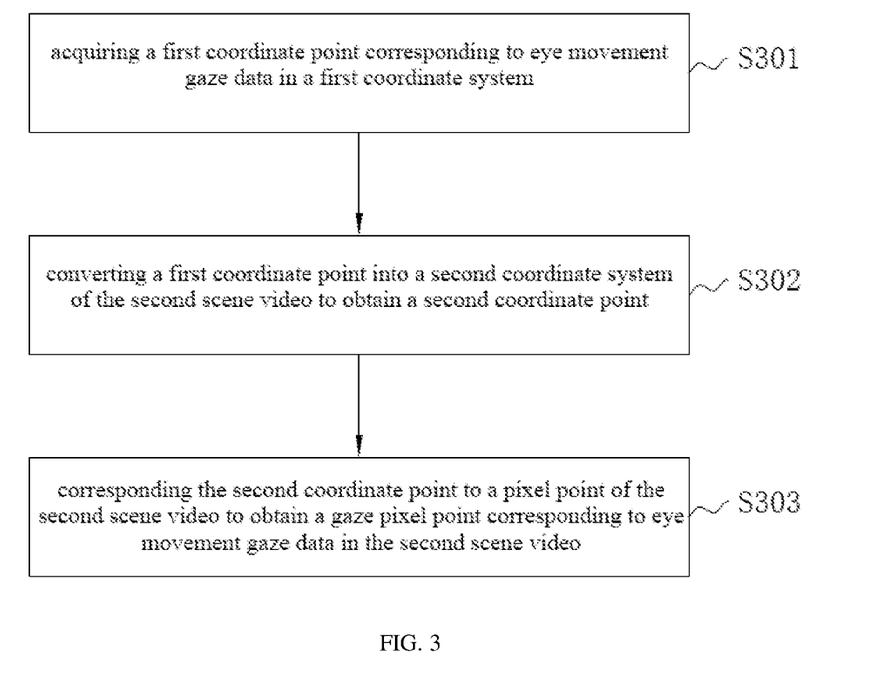
FIG. 3 is a specific schematic flow diagram of step S130 in the present application.

S30, superposing the eye movement gaze data with the second scene video to obtain a gaze pixel point corresponding to the eye movement gaze data in the second scene video;

wherein, specifically, as shown in FIG. 3, the eye movement gaze data is superposed with the second scene video to obtain the gaze pixel point corresponding to the eye movement gaze data in the second scene video, including sub-steps S301-S303:

S301, acquiring a first coordinate point corresponding to eye movement gaze data in a first coordinate system;

wherein, specifically, the first coordinate system is one three-dimensional coordinate system, and the first coordinate system may take the scene camera as an origin of coordinate, take the vertical direction as a coordinate Z axis, take a horizontal shooting direction to which the scene camera directly faces as the coordinate X-axis, and take a direction perpendicular to the horizontal shooting direction of the scene camera as a coordinate Y axis.

The position of the gazed object can be represented by a three-dimensional coordinate point or a vector of the line of sight of a target user.

S302, converting a first coordinate point into a second coordinate system of the second scene video to obtain a second coordinate point;

wherein, specifically, the second coordinate system is one two-dimensional coordinate system, and the second coordinate system can take the central pixel point of the second scene video as the origin of the coordinate, the transverse arrangement direction of the pixel as the coordinate X axis, and the longitudinal arrangement direction of the pixel as the coordinate Y axis.

S303, corresponding the second coordinate point to a pixel point of the second scene video to obtain a gaze pixel point corresponding to eye movement gaze data in the second scene video.

Specifically, the eye movement gaze data is converted into a coordinate system of the second scene video so that the gaze position of the eye movement gaze data is represented by the position of the gaze pixel point;

in the present embodiment, each set of the eye movement gaze data corresponds to each frame of the second scene image of the second scene video on a one-to-one basis, and the gaze pixel points at which each set of eye movement gaze data gazes in the corresponding each frame of the second scene graph are determined.

S40, determining a gaze pixel point corresponding to each frame image in the second scene video and output, in combination with the time sequence, the eye movement data index of the target user gazing at the eye movement area of interest.

Figure 4:
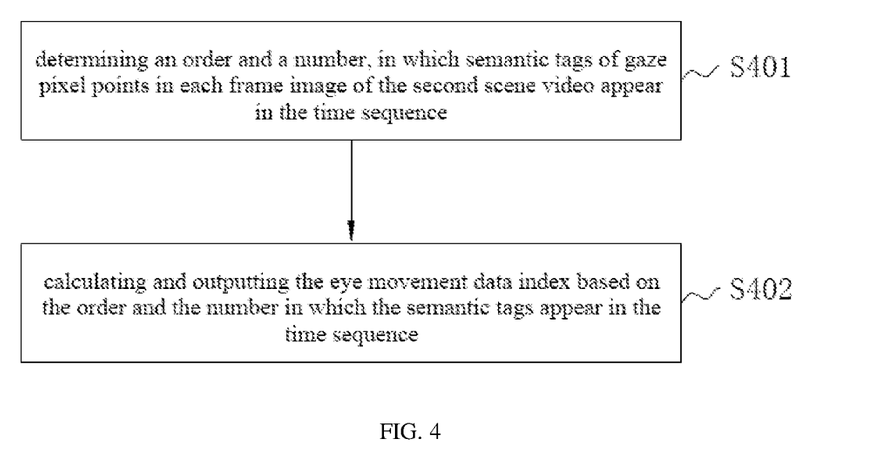
FIG. 4 is a specific schematic flow diagram of step S140 in the present application.

Specifically, the time sequence can be based on the frame rate and the number of frames of the second scene video, for example, the frame rate of the second scene video is 30 frames/second, which is 3000 frames in total, and then the second scene video having 100 seconds, and the residence time of each frame image in the second scene video being 1/30 second can be obtained; as shown in FIG. 4, it is determined that a gaze pixel point corresponds to each frame image in the second scene video, and combining with the time sequence to output the eye movement data index of the target user gazing at the eye movement area of interest comprises sub-steps S401-S402:

S401, determining an order and a number, in which semantic tags of gaze pixel points in each frame image of the second scene video appear in the time sequence; and S402, calculating and outputting the eye movement data index based on the order and the number in which the semantic tags appear in the time sequence.

Specifically, the eye movement data index includes the first gaze time, the number of visits, the total visit duration, the gaze times, the total gaze duration, and the average gaze duration.

In the present embodiment, the semantic segmentation of the first scene video is performed by using the deep learning algorithm to achieve automatic division and identification of the eye movement area of interest of the first scene video and obtain the second scene video, so that, to a certain extent researchers can avoid spending a lot of time adjusting the shape and size of the eye movement area of interest frame by frame, and then the eye movement gaze data is superposed with the second scene video to obtain the gaze pixel points corresponding to the eye movement gaze data in the second scene video. Therefore, the output eye movement data index of the eye movement area of interest of the target user in the environment can be obtained; therefore, the present application can reduce the time for studying the eye movement behavior of a target user when the shape and position of a research object in a scene video change dynamically.

An embodiment of the present application also provides an eye movement analysis system.

Figure 5:
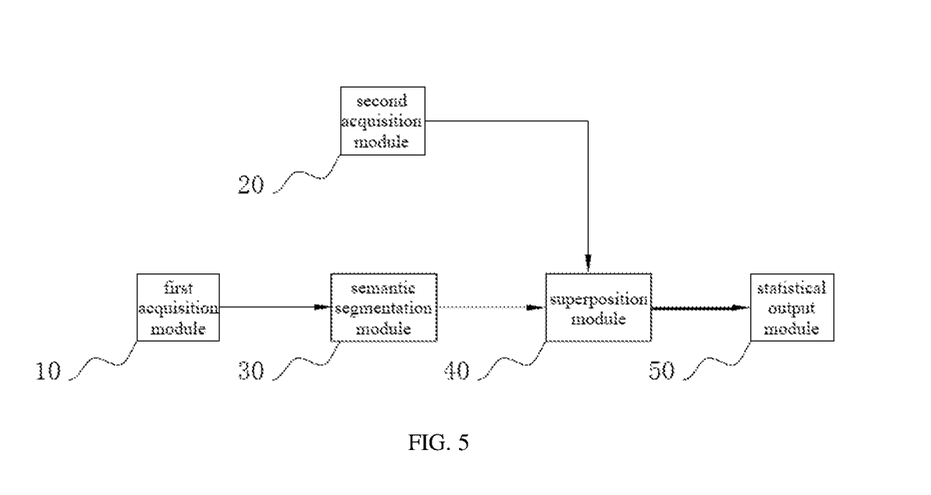
FIG. 5 is a block diagram of a structure of an eye movement analysis system of one of the embodiments of the present application.

As shown in FIG. 5, an eye movement analysis system comprises a first acquisition module, a second acquisition module, a semantic segmentation module, a superposition module, and an output module. The first acquisition module is configured for acquiring a first scene video seen by a target user in a preset environment; the second acquisition module is configured for acquiring eye movement gaze data of the target user in an environment when the first acquisition module acquires the first scene video; the semantic segmentation module is configured for receiving the first scene video, and performing semantic segmentation on the first scene video by using a deep learning algorithm so as to obtain a second scene video, wherein the second scene video is divided to have an eye movement area of interest; the superposition module is configured for receiving the second scene video and the eye movement gaze data, and superposing the eye movement gaze data with the second scene video so as to obtain a gaze pixel point corresponding to the eye movement gaze data in the second scene video; the output module is configured for determining the eye movement area of interest where the gaze pixel point is located, and outputting, in combination with the time sequence, the eye movement data index of the eye movement area of interest.

In the present embodiment, the first acquisition module acquires a first scene video seen by a target user in a preset environment, and at the same time, the second acquisition module acquires eye movement gaze data of the target user in the environment; the semantic segmentation module, based on the deep learning algorithm, performs semantic segmentation on the first scene video to realize the automatic division and identification of the eye movement area of interest of the first scene video so as to obtain the second scene video, and then the superposition module superposes the eye movement gaze data with the second scene video to obtain the corresponding gaze pixel point of the eye movement gaze data in the second scene video; therefore, the output module can output the eye movement data index of the target user gazing at the eye movement area of interest in the environment; since the present application uses the deep learning algorithm, performs semantic segmentation on the first scene video, and automatically divides the eye movement area of interest, to a certain extent, researchers can avoid spending a lot of time adjusting the shape and size of the eye movement area of interest frame by frame, and further, the time required to study the eye movement behavior of the target user can be reduced when the shape and position of the research object in the scene video change dynamically.

Figure 6:
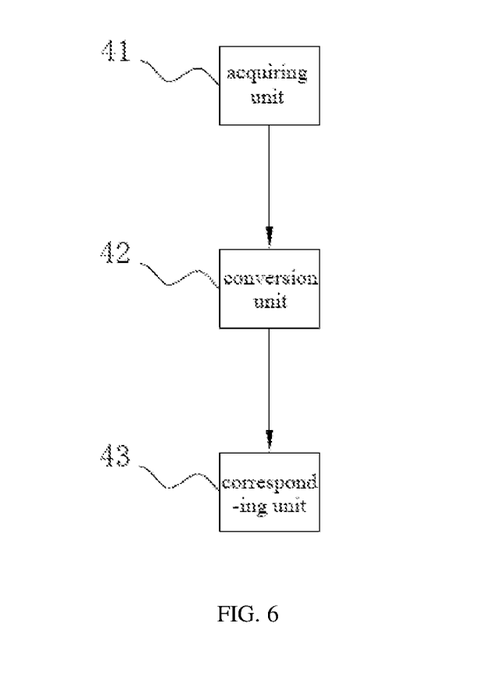
FIG. 6 is a block diagram of a structure of a superposition module of one of the embodiments of the present application.

As shown in FIG. 6, as an implementation mode of the superposition module, the superposition module comprises a acquiring unit, a conversion unit, and a corresponding unit; wherein the acquiring unit is configured for acquiring a first coordinate point corresponding to the eye movement gaze data in the first coordinate system; the conversion unit is configured for converting the first coordinate point into a second coordinate system of a second scene video to obtain a second coordinate point; the corresponding unit is configured for corresponding the second coordinate point to a pixel point of the second scene video, and obtaining a gaze pixel point corresponding to the eye movement gaze data in the second scene video.

In the present embodiment, the eye movement gaze data of the target user is converted into the coordinate system of the second scene video, and the eye movement gaze data corresponds to the gaze pixel point of the second scene video.

The eye movement analysis system of the present application is capable of implementing any method of the eye movement analysis methods described above, and the specific working process of the eye movement analysis system refers to the corresponding process in the above method embodiments.

An embodiment of the present application also provides a computer apparatus.

The computer apparatus includes a memory, a processor, and a computer program stored on the memory and executable on the processor. The processor, when executing a program, realizes the method as in the first aspect.

An embodiment of the present application also provides a computer-readable storage medium.

The computer-readable storage medium stores a computer program capable of being loaded by a processor and executing the method of the first aspect.

It needs to be noted that in the above-mentioned embodiments, the description of each embodiment has its own emphasis. Parts of a certain embodiment that are not described in detail may be referred to the related description of other embodiments.

In the several embodiments provided herein, it should be understood that the methods and system devices provided may be implemented in other ways. For example, the division of a certain module is only a logical function division. In actual implementation, there can be other division modes, for example, multiple units or assemblies can be combined or integrated into another system.

The above are preferred embodiments of the application, and do not limit the scope of the application accordingly. Therefore: all equivalent changes made in accordance with the structure, shape, and principle of the application shall be covered by the scope of the application.

What is claimed is:

1. An eye movement analysis method, comprising:
    acquiring a first scene video seen by a target user in a preset environment, and acquiring eye movement gaze data of the target user in the preset environment;
    performing semantic segmentation on the first scene video based on a deep learning algorithm to obtain a second scene video; wherein, the second scene video is divided to have eye movement area of interest;
    superposing the eye movement gaze data with the second scene video to obtain a gaze pixel point corresponding to the eye movement gaze data in the second scene video; and
    determining the gaze pixel point corresponding to each frame image in the second scene video, and outputting, in combination with a time sequence, an eye movement data index of the target user gazing at the eye movement area of interest,
    wherein the superposing the eye movement gaze data with the second scene video to obtain a gaze pixel point corresponding to the eye movement gaze data in the second scene video comprises:
        acquiring a first coordinate point corresponding to the eye movement gaze data in a first coordinate system, wherein the first coordinate system is a three-dimensional coordinate system, and the first coordinate system takes a scene camera shooting the first scene video as an origin of coordinate, takes a vertical direction as a coordinate Z axis, takes a horizontal shooting direction to which the scene camera directly faces as a coordinate X axis, and takes a direction perpendicular to the horizontal shooting direction of the scene camera as a coordinate Y axis;
        converting the first coordinate point into a second coordinate system of the second scene video to obtain a second coordinate point, wherein the second coordinate system is one two-dimensional coordinate system, and the second coordinate system takes a central pixel point of the second scene video as an origin of coordinate, takes a transverse arrangement direction of pixels as a coordinate X axis, and takes a longitudinal arrangement direction of pixels as a coordinate Y axis; and
        corresponding the second coordinate point to a pixel point in the second scene video to obtain the gaze pixel point corresponding to the eye movement gaze data in the second scene video,
    wherein the deep learning algorithm uses DeepLab, EncNet, SegNet, or PSPNet,
    wherein the performing semantic segmentation on the first scene video comprises:
        assigning a semantic tag to each pixel in the first scene video; and
        dividing the eye movement area of interest based on the semantic tag,
    wherein the determining the gaze pixel point corresponding to each frame image in the second scene video and outputting, in combination with a time sequence, an eye movement data index of the target user gazing at the eye movement area of interest comprise:
        determining an order and a number, in which semantic tags of gaze pixel points in each frame image in the second scene video appear in the time sequence; and
        calculating and outputting the eye movement data index based on the order and the number in which the semantic tags appear in the time sequence, and
    wherein the eye movement data index comprises: first gaze time, number of visits, total visit duration, gaze times, total gaze duration, and average gaze duration.

2. A computer apparatus, comprising: memory, a processor, and a computer program stored on the memory and executable on the processor, wherein, the processor is configured to execute the computer program to implement the eye movement analysis method of claim 1.

3. A non-transitory computer readable storage medium with a computer program stored thereon, wherein, the computer program is configured to be loaded by a processor and to execute the eye movement analysis method of claim 1.

4. An eye movement analysis system, comprising: a first acquisition module, a second acquisition module, a semantic segmentation module, a superposition module, and an output module; wherein
    the first acquisition module is configured for acquiring a first scene video seen by a target user in a preset environment;
    the second acquisition module is configured for simultaneously acquiring eye movement gaze data of the target user in the preset environment when the first acquisition module acquires the first scene video;
    the semantic segmentation module is configured for receiving the first scene video, and performing semantic segmentation on the first scene video based on a deep learning algorithm to obtain a second scene video, wherein the second scene video is divided to have an eye movement area of interest;

the superposition module is configured for receiving the second scene video and the eye movement gaze data, and superposing the eye movement gaze data with the second scene video to obtain a gaze pixel point corresponding to the eye movement gaze data in the second scene video;

the output module is configured for determining the gaze pixel point of each frame image in the second scene video, and outputting, in combination with a time sequence, an eye movement data index of the target user gazing at the eye movement area of interest;

the superposition module comprises an acquiring unit, a conversion unit, and a corresponding unit;

the acquiring unit is configured for acquiring a first coordinate point corresponding to the eye movement gaze data in a first coordinate system, wherein the first coordinate system is a three-dimensional coordinate system, and the first coordinate system takes a scene camera shooting the first scene video as an origin of coordinate, takes a vertical direction as a coordinate Z axis, takes a horizontal shooting direction to which the scene camera directly faces as a coordinate X axis, and takes a direction perpendicular to the horizontal shooting direction of the scene camera as a coordinate Y axis;

the conversion unit is configured for converting the first coordinate point into a second coordinate system of the second scene video to obtain a second coordinate point, wherein the second coordinate system is one two-dimensional coordinate system, and the second coordinate system takes a central pixel point of the second scene video as an origin of coordinate, takes a transverse arrangement direction of pixels as a coordinate X axis, and takes a longitudinal arrangement direction of pixels as a coordinate Y axis;

the corresponding unit is configured for corresponding the second coordinate point to a pixel point in the second scene video to obtain the gaze pixel point corresponding to the eye movement gaze data in the second scene video, the deep learning algorithm uses DeepLab, EncNet, SegNet, or PSPNet, the performing semantic segmentation on the first scene video comprises:
   assigning a semantic tag to each pixel in the first scene video; and
   dividing the eye movement area of interest based on the semantic tag, the determining the gaze pixel point corresponding to each frame image in the second scene video and outputting, in combination with a time sequence, an eye movement data index of the target user gazing at the eye movement area of interest comprise:
   determining an order and a number, in which semantic tags of gaze pixel points in each frame image in the second scene video appear in the time sequence; and
   calculating and outputting the eye movement data index based on the order and the number in which the semantic tags appear in the time sequence, and wherein the eye movement data index comprises: first gaze time, number of visits, total visit duration, gaze times, total gaze duration, and average gaze duration.

* * * * *